United States Patent [19]

Frosch et al.

[11] 4,101,008

[45] Jul. 18, 1978

[54] ARRANGEMENT FOR ABSORBING VIBRATIONS

[75] Inventors: Albert Frosch, Herrenberg; Walter Mannsdöerfer, Aidlingen; Claus Scheuing, Lorch, all of Fed. Rep. of Germany

[73] Assignee: International Business Machines Corporation, Armonk, N.Y.

[21] Appl. No.: 762,619

[22] Filed: Jan. 26, 1977

[30] Foreign Application Priority Data

Jan. 31, 1976 [DE] Fed. Rep. of Germany ....... 2603688

[51] Int. Cl.² .............................................. F16F 13/00
[52] U.S. Cl. ...................................... 188/1 B; 267/137
[58] Field of Search ............. 188/1 B; 248/20, 358 R; 267/137

[56] References Cited

U.S. PATENT DOCUMENTS

| 2,226,571 | 12/1940 | McGoldrick | 188/1 B |
| 2,964,272 | 12/1960 | Olson | 188/1 B |
| 3,088,062 | 4/1963 | Hudimac | 188/1 B X |
| 3,387,499 | 6/1968 | Bruderlein | 188/1 B X |
| 3,656,014 | 4/1972 | Rich | 188/1 B X |

Primary Examiner—Duane A. Reger
Attorney, Agent, or Firm—James A. Ruth; Edward S. Drake

[57] ABSTRACT

This invention is directed to an arrangement for compensating and absorbing vibratory oscillations of a driven spring-mass system by means of an auxiliary spring mass system. The drive for a main spring-mass system is designed such that it is guided along the same axis as the main system and oscillates out of phase with the main system.

8 Claims, 3 Drawing Figures

ARRANGEMENT FOR ABSORBING VIBRATIONS

BACKGROUND OF THE INVENTION

1. Field of the Invention

In many machines, devices, and arrangements with oscillating masses measures have to be taken to prevent, or at least keep within very narrow limits, the transfer of oscillations to other components of the machine. Although in the case of periodic oscillations the spring-mass system can be designed in such a manner that the resonance frequencies are as far apart as possible from each other, thus preventing masses or mass systems capable of oscillating from resonating as a result of the natural frequency of the oscillating mass, such a measure is insufficient to prevent undesirable oscillations of other components or groups of components. Apart from this, it is ineffective in the case of systems with varying resonance frequencies.

Measures for damping oscillations are widely known. In many instances, however, it is very difficult to dampen an oscillating structure or such damping is undesirable because it would impair the function of the oscillating system. Therefore, the measures taken to this end were frequently aimed at damping, by means of flexible elements, the transfer of oscillations between components that are mechanically coupled to each other. However, in most cases such measures change merely the characteristic of the spurious forces, such as jerks or vibrations of adjacent machine components, without a significant reduction being obtained in the amount of energy transferred.

Oscillation quenching, also known as dynamic absorption, has proved the most effective method of preventing an undesirable transfer of oscillation forces of moved masses. This method ensures that the forces transferred to adjacent machine components are compensated at least in part and that in principle it is possible for oscillations to be quenched completely. The overwhelming majority of the known oscillation quenching arrangements relate to freely oscillating structures, whose oscillations are solely a function of the dimensions of the oscillating structure, such as overhead lines, for which an oscillation quenching arrangement is described in West German published patent application No. 2,056,164. Also known, however, are oscillation quenchers for constrained or forced oscillations, i.e., oscillations encountered in connection with masses capable of oscillating and which are moved by an extraneous — periodic or aperiodic — driving power. One of the most significant solutions in this field is what is known as the Taylor pendulum which quenches constrained rotary oscillations on motors over their full speed range. The Taylor pendulum is a rotating system with an eccentrically coupled centrifugal pendulum, whereby the excitation is diverted from the actual oscillaing system to the coupled pendulum. See VDI-Zeitschrift, November 5, 1938, pages 1297-1300. The disadvantages of this solution are that an additional oscillating mass is needed and that the pendulum can be used only for rotating mass systems.

Also see K. N. Tong's "Theory of Mechanical Vibrations" pages 138, through 146, J. Wiley & Sons, 1960, which discusses dynamic vibration absorbers consisting of a small vibratory system coupled to a machine, or other structure, to control vibrations. Such an absorber is designed so that when the machine is subject to a periodic oscillatory excitation the resulting vibration produces coupling forces that tend to cancel out the excitation forces.

West German Pat. No. 1,030,594 published on May 22, 1958, discloses a mechanical vibration system whose active mass carries at least one electromagnetic vibration generator joined to it by a coupling spring. The coupling spring and the total mass of the generator are dimensioned in such a manner that the natural frequency of the oscillation system equals, or almost equals the operation frequency.

Another prior art arrangement is shown in Hartmann's West German patent application No. 1,806,110 published on June 12, 1969 with priority of first filing in the United States on Nov. 2, 1967. This arrangement is a two mass vibration system consisting of a funnel, material being transported through the funnel to a material receiving transport tray for receiving a controlled quantity of material per unit of time such that the masses are flexibly coupled to form a correlated system having a single degree of freedom and whose mass natural frequency is nearly the same as the excitation frequency.

Also known, however, is an oscillation quencher which is used for linearly oscillating spring-mass systems. In this quencher which is known as the Frahm quencher (see Den Hartog, "Mechanical Oscillations", McGraw Hill 1934, p. 104) an oscillation system which is small in relation to the oscillating machine component is coupled to the main system whose natural frequency $\sqrt{c/m}$ is chosen so that it equals the oscillating or excitation force. However, this arrangement, too, requires an additional oscillating mass and has the disadvantage that oscillations can be quenched only in those cases where the frequency of the excitation force is essentially constant. Therefore, the use of the latter system is limited to apparatus which is directly coupled to electric synchronous motors or synchronous generators.

BRIEF SUMMARY OF THE INVENTION

It is the object of the invention to provide an arrangement, by means of which the mass forces of an oscillating system can be quenched completely and very effectively, without having to use an additional mass in each case. To this end the invention is characterized in that in the case of an arrangement of the kind described above the drive itself is designed as a spring-mass auxiliary system which is guided in the continuation of the path of movement of the spring-mass main system in such a manner that it oscillates at the same frequency as, out of phase with, the spring-mass main system.

The special advantage of the arrangement in accordance with the invention is that both in the case of linearly oscillating systems and in the case of constrained rotary oscillations, the oscillations encountered are quenched completely, irrespective of the frequency at which the oscillating element is excited. The arrangement in accordance with the invention is preferably used for applications where the masses of the oscillating element and the drive are nearly the same.

DESCRIPTION OF THE DRAWINGS

The invention is further described with reference to the accompanying drawings in which.

DETAILED DESCRIPTION OF THE PREFERRED EMBODIMENTS

Figure 1:
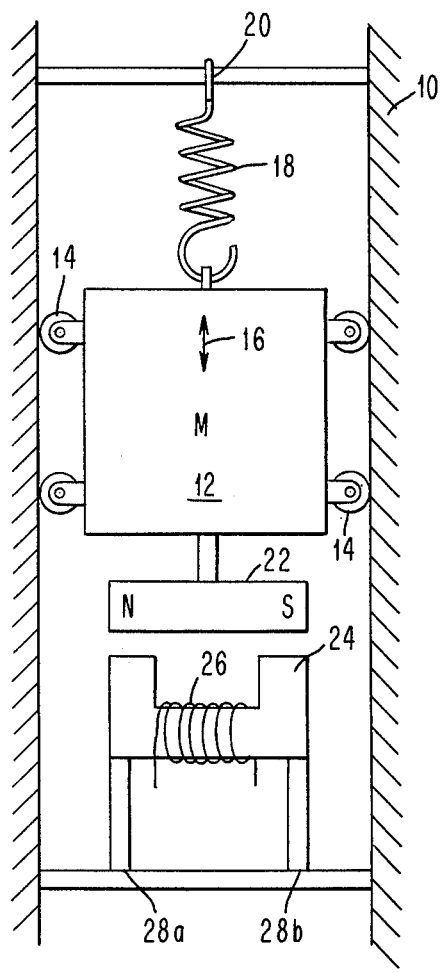
FIG. 1 is a schematic representation of an oscillating system, driven by a stationary electromagnetic drive, without oscillation quenching.

In accordance with FIG. 1, an element 12 having a specific mass can be moved in a machine frame 10 by means of rollers 14 in the directions marked by the double arrow 16. The element 12 is attached to the machine frame 10 at point 20 by means of a spring 18. An armature piece 22 in the form of a permanent magnet is attached to the opposite end of the element 12. The armature piece 22 interacts with an electromagnetic drive consisting of a coil 26 with a yoke 24 which is attached to the machine frame 10 at the points 28a, 28b.

When the coil 26 is periodically excited, the element 12 operates in a reciprocal movement of suitable frequency, whereby oscillation energy is transferred to the machine frame 10 via point 20 as well as points 28a and 28b with the consequence that these forces disturb the whole system. This may impair both the functions performed by the illustrated element 12 and the functional operations of adjacent component groups also arranged in the machine frame 10.

Figure 2:
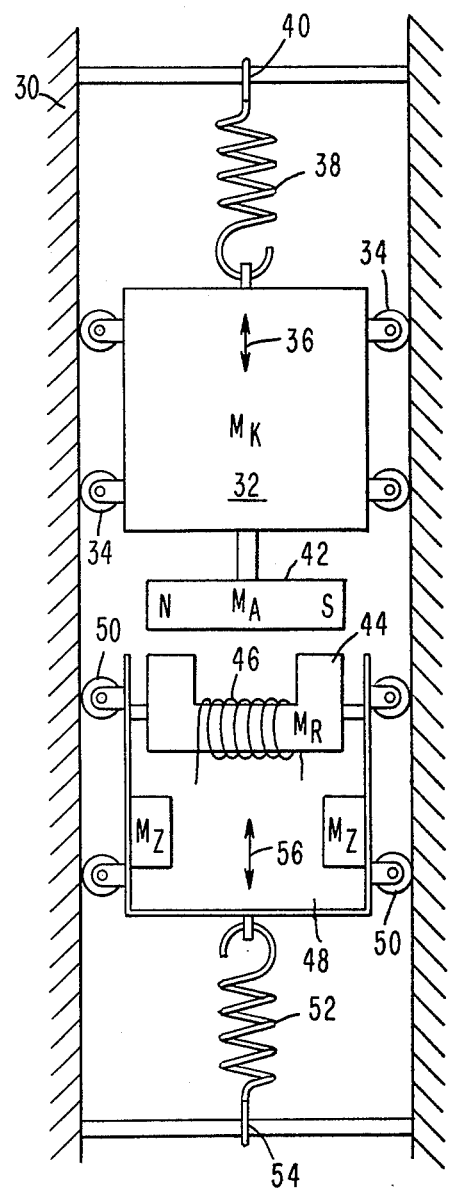
FIG. 2 is a schematic representation of an oscillating system with oscillation quenching in accordance with the invention.

Similar to FIG. 1, the element 32 in the arrangement shown in FIG. 2 is guided in the machine frame 30, via rollers 34, in the directions marked by the double arrow 36 and is attached to the machine frame 30 at point 40 by means of a spring 38. Similarly, an armature piece 42 designed as a permanent magnet is attached to the opposite end of the element 32.

The electromagnetic drive associated with the armature piece 42 and consisting of the coil 46 with the yoke 44 is not rigidly supported in the machine frame 30, as shown in the example of FIG. 1, but is arranged in a drive frame 48 which, similar to the element 32, is guided on rollers 50 and which is coupled to the machine frame 30 at point 54 by means of a spring 52.

When the elements of the system shown in FIG. 2 are designed, care must be taken that the springs 38 and 52 both have the same characteristic value and that the two moved masses, i.e., the first (driven) mass $M_k + M_a$ formed by the element 32 and the armature piece 42 and the (driving) mass $M_r$ formed by the coil 46, the yoke 44, and the drive frame 48, are equal. In order to ensure equality between mass $M_k$ and mass $M_r$, two additional masses $M_z$ are provided on the drive frame, so that the equation applicable to the masses is: $M_k + M_a = M_r + 2M_z$. If the sum of the masses $M_k$ and $M_a$ of the element 32 and the armature piece 42 is greater than the mass $M_r$ of the drive 44, 46, and 48, it is possible, in principle, provided this is feasible from a design standpoint, to reduce the sum of the masses $M_k$ and $M_a$ accordingly. A third prerequisite ensuring that the oscillation movements of the illustrated system cannot exert any detrimental influence is that the two oscillating masses with their mass points of gravity move on a single linear path.

If as a result of the periodic excitation of the coil 46 the drive in the arrangement of FIG. 2 is switched on, both masses, i.e., the element with the armature piece 42 on the one hand and the yoke 44, the coil 46, and the drive frame 48 on the other, oscillate invariably out of phase at the same amplitude, since both masses are identical. The forces transferred to the machine frame 30 via points 40 and 54 are thus always of the same magnitude and opposed to each other. If the machine frame 30 is sufficiently rigid between the points 40 and 54, it remains undisturbed, thus transferring no oscillations to the outside.

The arrangement shown in FIG. 2 for a linear oscillation movement with total oscillation quenching can also be suitably modified for oscillating rotary movements of an element in that not only the driven but also the driving element is supported as a structure capable of oscillating. As in the case described above, a prerequisite for complete oscillation quenching is that the spring elements and the moments of inertia are identical. To ensure that the sum of the dynamic forces exerted on the axle or shaft is invariably zero, care must be taken that each of the rotary masses is staticly balanced per se and dynamically balanced with regard to the axis of rotation.

Figure 3:
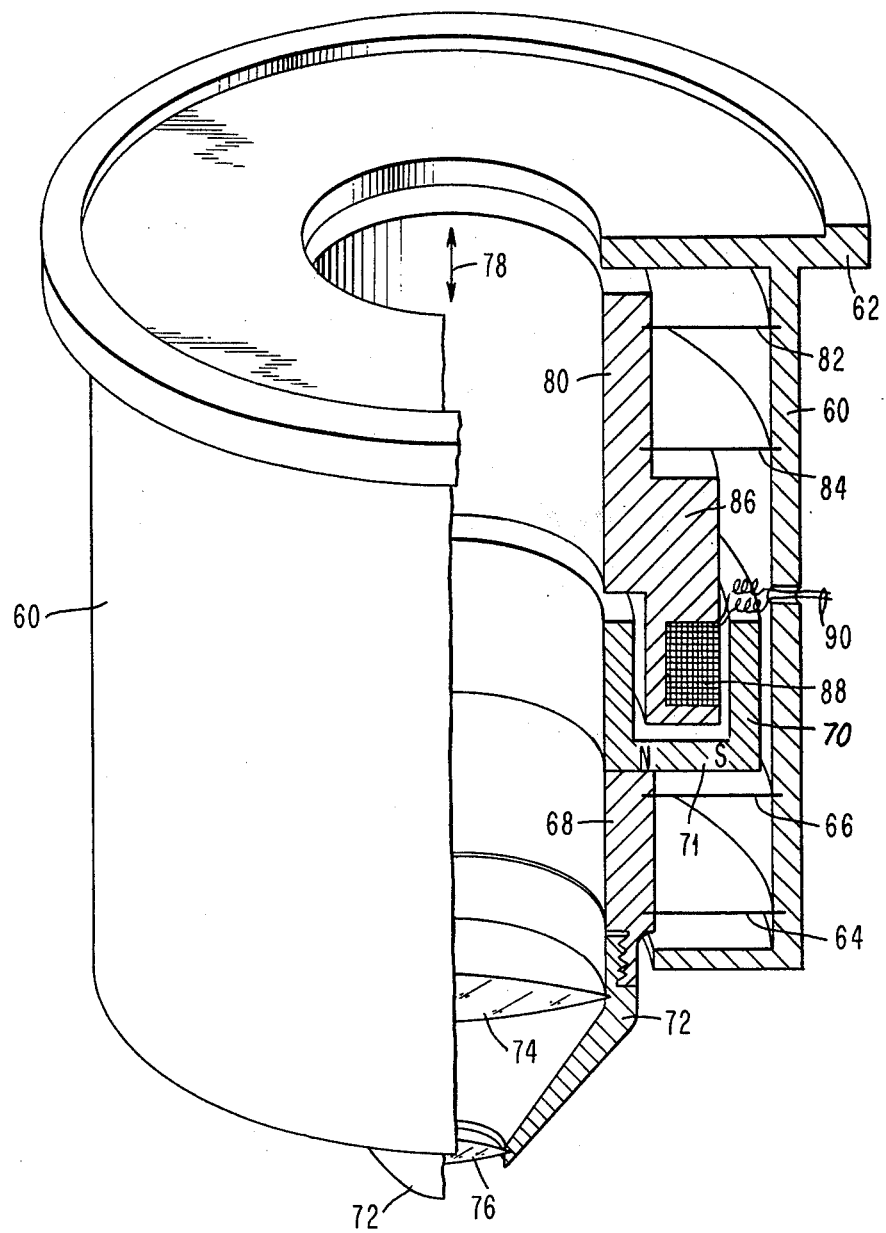
FIG. 3 is a perspective representation of an arrangement designed in accordance with the principle explained in FIG. 2 by means of a measuring device taking the form of a microscope objective oscillator.

The principle illustrated in FIG. 2 is realized in the embodiment of FIG. 3. In this case, a measuring device is designed as a microscope objective oscillator, i.e., a lens system must be linearly moved up and down along its optical axis at high frequency. To this end a yoke carrier 68, on the upper side of which a yoke 70 with a permanent magnet 71 is arranged, is guided in a housing 60 attached to the lower side of a measuring device (not shown) by means of membrane springs 64 and 66. An objective carrier ring 72 in which the lenses 74 and 76 are guided is screwed into the yoke carrier 68 from below. The yoke carrier 68 and the objective carrier ring 72 are movable, since they are flexibly mounted on the optical axis of the lenses 74 and 76 defined by the beam path 78.

In the upper part of the housing 60 a coil carrier 80 is mounted by means of membrane springs 82 and 84. On the lower end of the coil carrier 80 a coil ring 86 with a coil 88 is arranged which is connected to an a.c. generator via a line 90.

For complete oscillation quenching during operation of the illustrated arrangement, the membrane springs 64 and 66 as well as 82 and 84 are identically designed, and the elements which are individually axially movable by means of the membrane springs. i.e., the yoke carrier 68 with the yoke 70, the permanent magnet 71, the objective carrier ring 72, and the lenses 74 and 76 on the one hand the coil carrier 80 with the coil ring 86 and the coil 88 on the other, have the same mass.

When the arrangement of FIG. 3 is put into operation, the two mass systems mounted independently of each other start to oscillate at the same frequency, but out of phase with each other, as a function of the electric field between coil 88 and permanent magnet 71. At the same time oscillation energy is transferred to the housing 60 via the membrane springs, but the forces resulting from the two masses have the same magnitude and are opposed to each other. Thus the housing 60 remains undisturbed, so that no spurious forces can reach the connected measuring device or the other adjacent components.

What is claimed is:

1. In an arrangement for compensating oscillations of the mass forces of a driven oscillating spring-mass main system of a spring-mass auxiliary system, wherein the mass and spring rate of said auxiliary system are identical to the mass and spring rate of said main system, a magnetic means for coupling said systems, with said auxiliary system being operable by said magnetic means in a continuation of the same path of movement of said main system and oscillatable at the same frequency but out of phase with respect to said main system.

2. The apparatus according to claim 1 in which said magnetic means comprises an electrically operated coil on a carrier in said auxiliary system and a magnetic element in said main system.

3. The apparatus according to claim 1 in which an identical spring means is remotely situated from said magnetic means in the path of movement of both said systems and connects each said system to a common surface, thereby making the forces transferred to said surface of the same magnitude and opposed to each other.

4. The apparatus according to claim 1 in which said auxiliary system and said main system include means for guiding both said systems along a common surface.

5. The apparatus according to claim 4 in which said guiding means includes rollers.

6. The apparatus according to claim 1 in which said main system comprises lenses located in an optical instrument.

7. Apparatus as claimed in claim 1 wherein said magnetic element is an electromagnet.

8. Apparatus as claimed in claim 1 wherein said magnetic element is a permanent magnet.

* * * * *